(12) United States Patent
Moore et al.

(10) Patent No.: US 6,703,569 B2
(45) Date of Patent: Mar. 9, 2004

(54) ROLL-OFF TRUCK/TRAILER WITH WEIGHING SYSTEM

(75) Inventors: Ronald Brien Moore, Bellaire, TX (US); Lloyd Glynn Paige, Crosby, TX (US)

(73) Assignee: S'Morf, Inc., Houston, TX (US)

( * ) Notice: Subject to any disclaimer, the term of this patent is extended or adjusted under 35 U.S.C. 154(b) by 247 days.

(21) Appl. No.: 09/978,963

(22) Filed: Oct. 16, 2001

(65) Prior Publication Data

US 2002/0062997 A1 May 30, 2002

Related U.S. Application Data

(63) Continuation-in-part of application No. 09/193,139, filed on Nov. 17, 1998, which is a continuation-in-part of application No. 08/492,739, filed on Jun. 21, 1995, now Pat. No. 5,861,580.

(51) Int. Cl.[7] .............................................. G01G 19/08
(52) U.S. Cl. ....................... 177/136; 177/141; 177/139; 177/146
(58) Field of Search ................................. 177/136, 137, 177/138, 141, 146

(56) References Cited

U.S. PATENT DOCUMENTS

| | | | |
|---|---|---|---|
| 3,587,760 A | 6/1971 | Linz et al. | 177/146 |
| 3,971,451 A | 7/1976 | Norberg | 177/136 |
| 4,137,977 A | 2/1979 | Alger | 177/146 |
| 4,673,048 A | 6/1987 | Curran | 177/146 |
| 5,578,798 A | 11/1996 | Nuyts | 177/136 |
| 5,635,680 A | 6/1997 | Dojan | 177/136 |
| 5,773,768 A | 6/1998 | Nuyts | 177/136 |

*Primary Examiner*—Randy Gibson
(74) *Attorney, Agent, or Firm*—Kurt S. Myers

(57) ABSTRACT

The present invention is directed to a roll-off truck/trailer and a method for weighing the box that is positioned horizontally on the truck/trailer. More specifically, the present invention is directed to a weighing system mounted on a roll-off truck/trailer that has four lifts, two on each side of the truck/trailer, and load cells mounted on the lifts. The method of the present invention involves positioning a box in a horizontal position on the roll-off truck/trailer and lifting the box with load cells that are fixed on the top of lifts mounted on each side to the chasis of the truck/trailer.

14 Claims, 6 Drawing Sheets

ROLL-OFF TRUCK/TRAILER WITH WEIGHING SYSTEM

RELATED APPLICATIONS

This application is a continuation-in-part application of U.S. Ser. No. 09/193,139 filed Nov. 17, 1998 entitled "Roll-off Truck with Weighing System", which is a continuation-in-part application of U.S. Ser. No. 08/492,739 filed Jun. 21, 1995 entitled "Load Cell and Weighing System", now U.S. Pat. No. 5,861,580, both of which are incorporated herein by reference for all purposes.

FIELD OF THE INVENTION

The present invention is directed to a roll-off truck/trailer that has a weighing system on the truck/tailer for weighing the box on the truck/tailer. More specifically, the weighing system of the present invention is directed to four load cells mounted on top of lifts. The bottom of the lifts are rigedly secured to the frame or chasis of a roll-off truck/tailer to weigh the roll-off box on the roll-off truck/tailer.

BACKGROUND OF THE INVENTION

Presently, roll-off trucks have a standard track or two rails that are moved from a horizontal position on the truck to a position having the back end of the rails touching the ground and the front end raised to hoist a box up on the rails. The roll-off box, which can be empty or filled, has a pair of beams which are spaced on the bottom of the box so that when pulled on to the rails of the roll-off lift they are outside the rails. A plurality of rollers are on the outside of each rail of the roll-off lift. The beams of the box have a height just sufficient to contact the rollers. When the box is pulled toward the truck, the box is aligned with the rails of the roll-off truck aligning the box with the rails of the roll-off lift inside the beams of the roll-off box. The box will slide up on the rails and on the rollers of the roll-off lift. This system has been used to collect metals, scrap, trash, etc.

The presently used or prior art weighing system for collected material is to weigh a truck/tailer with a box empty of material and with material in the box, using the difference in weight to determine the weight of the collected material. This system of weighing requires the use of scales that can weigh the heavy weight of truck/tailer, box and material. However, this weighing system has the disadvantage that the truck/tailer must be driven to the scale to weigh the truck/tailer with the box both empty of material and fill of material and causes the weight to be inaccurate to the extent of any change in weight of the fuel in moving the truck/tailer from the scale and returning the truck/tailer for the second weighing.

SUMMARY OF THE INVENTION

The present invention is directed to a roll-off truck/trailer and a method for weighing the box that is positioned horizontally on the truck/trailer. More specifically, the present invention is directed to a weighing system mounted on a roll-off truck/trailer that has four lifts, two on each side of the truck/trailer, and load cells mounted on top of each of the four lifts. The method of the present invention involves positioning a box in a horizontal position on the roll-off truck/tailer and lifting the box with load cells that are fixed to the top of lifts mounted on each side of the truck/trailer. In addition, a hydraulic system, connected to the normal hydraulic system of the truck/trailer, actuates the lifts in an even manner so that the box is lifted off the rails of the truck/trailer onto the load cells for measurement of the box or box and material.

BRIEF DESCRIPTION OF THE PREFERRED EMBODIMENTS

Figure 1:
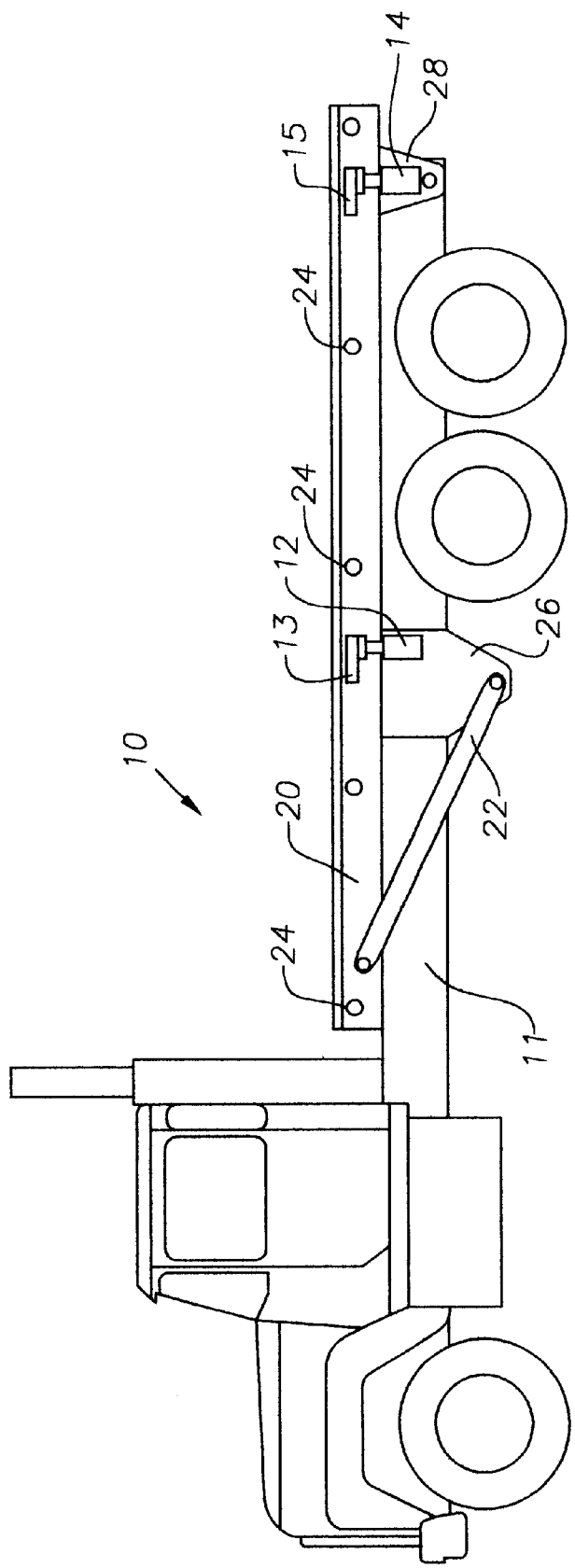
FIG. 1 is a side view of a roll-off truck with load cells mounted to the truck frame to provide a weighing system on the truck.

With conventional roll-off trucks that are presently used to collect materials such as scrap metal or trash and the like, metal boxes are used to hold the materials. To weigh the box used to hold the material, it is the usual method to weigh the truck without the box and then lift the box onto the truck and weigh both the truck and box. The difference in the two weights is the weight of the box. Likewise to determine the weight of material filling a box, it is the present method to weigh the truck and box, with the box empty and then weigh the box filled with material on the truck. The difference in the two weights is the weight of the material. While this seems to be straight forward and simple, the practical reality is there is no convient presence of a scale at the point of weighing the roll-off box empty and full. To obtain these weights requires the transportation of the roll-off boxes, that haul the trash or scrap and the like, to be transferred to a truck/trailer scale. This does not always allow this weighing procedure to be that simple, straightforward and accurate. The presence of a scale large enough to weigh trucks carrying loads in roll-off boxes are not readily available. Even when a scale is near the location of where the box is to be filled and the same truck is used to wait and have the box filled at a site, the difference in the two weights obtained at the scale does not give an exact weight of the material placed in the box. Consider a truck and empty roll-off box being weighed at the scale. The truck is then driven to the site and waits for the box to be filled with scrap or trash. The truck then returns to the scale to be weighed. The difference in the two weights does not take into account in these two weighings the amount of fuel burned by the truck from the time of the first weighing to the time of the second weighing, and this must be estimated to determine the true weight of the material in the box. In another real situation, a truck takes a rool-off box to the site to be filled with material and leaves the box. When the box has been filled, which may be days or weeks, another truck picks up the material. In this situation the difference in the weights of the trucks does not give accurate weighings.

To obtain the best weighing of scape metal taken to a scape dealers yard or trash taken to a landfill, the yard or landfill will have truck scales. A truck with a roll-off box filled with scrape metal, for example, will be weighed and then go and empty the box and have a second weighing with the box on the same truck empty. This is done with little fuel being burned in between the two weighings. The weights are accurate; however, a practical problem is that the person at the site where the scrap metal or other material was placed into the box has no weights until the metal or material has been delivered and removed from the box at the scrap yard or other desination.

Another real practical problem regarding weights of scrap or trash is that the filling of a box with different materials or material from two sites is not practical. For example, scrap metal may have different values. Stainless steel is more valuable than ordinary iron and different than aluminum. However, the cost of sending three trucks with separate boxes to collect these different materials is not practical especially if there is only a small amount of any given material. Collecting trash from two sites and taking the trash to a landfill is done routinely; however, asessing the cost associated to each of the collection sites presents a practical problem.

The present invention overcomes these weighing problematic situations setforth herein above by having a weighing system mounted directly on a roll-off truck/trailer.

Referring now to FIG. 1, a roll-off truck 10 is shown which is standard equipment for running a scrap yard or a trash hauling business. Common to any roll-off truck 10 is a frame or chasis 11. Above the frame 11 is a roll-off box lift or carrier that is comprised of a pair of rails 20 with reinforcement between the rails 20 and with a wheel at the end that allows the rails to roll away from the back of the truck 10 when they touch the ground. The roll-off box carrier is hydraulically operated with a hydraulic system that is on the truck 10. The rails 20 can be lifted by a hydraulic cylinder 22 and moved from the horizontal position on the truck 10 to set the end of the rails on the ground to collect a box that collects the material. There are a number of different roll-off trucks, some small and some large, some with the cylinders 22 (it being understood that another cylinder is on the other side of the truck) mounted in the direction shown and others with the cylinders in the opposite direction. The details of the roll-off truck 10 are not part of the present invention. Common to all roll-off trucks 10 is that a roll-off box 30 (FIG. 2) can be lifted from the ground to a horizontal position on the carrier having rails 20. Each of the rails 20 have rollers 24 extending to the outside of the rails 20 and the roll-off box 30 rests on these rollers. The box 30 has a pair of beams 32 which are spaced on the bottom of the box 30. When the box is pulled toward the truck, the rails 20 are aligned between the beams 32 and the box 30 is placed on and rolled along the rollers 24.

The present invention is directed to placing a weighing system onto the roll-off truck 10. More specifically as shown in FIG. 1, the roll-off truck 10 is modified by adding two lifts 12 and 14 to each side of the truck 10. Preferably the lifts are positioned so that the bottom of lifts 12 and 14 are rigidly attached to the chasis or frame 11 of the truck so as to not interfere with the operation of the carrier and rails 20; however, the hydraulic system used for the carrier is used for actuation of the lifts. One location for mounting the lifts to the chasis or frame of the truck 10 are the plates 26, used to affix the cylinder 22 for lifting the carrier and rails 20, and plates 28 located at the rear of the truck.

Figure 2:
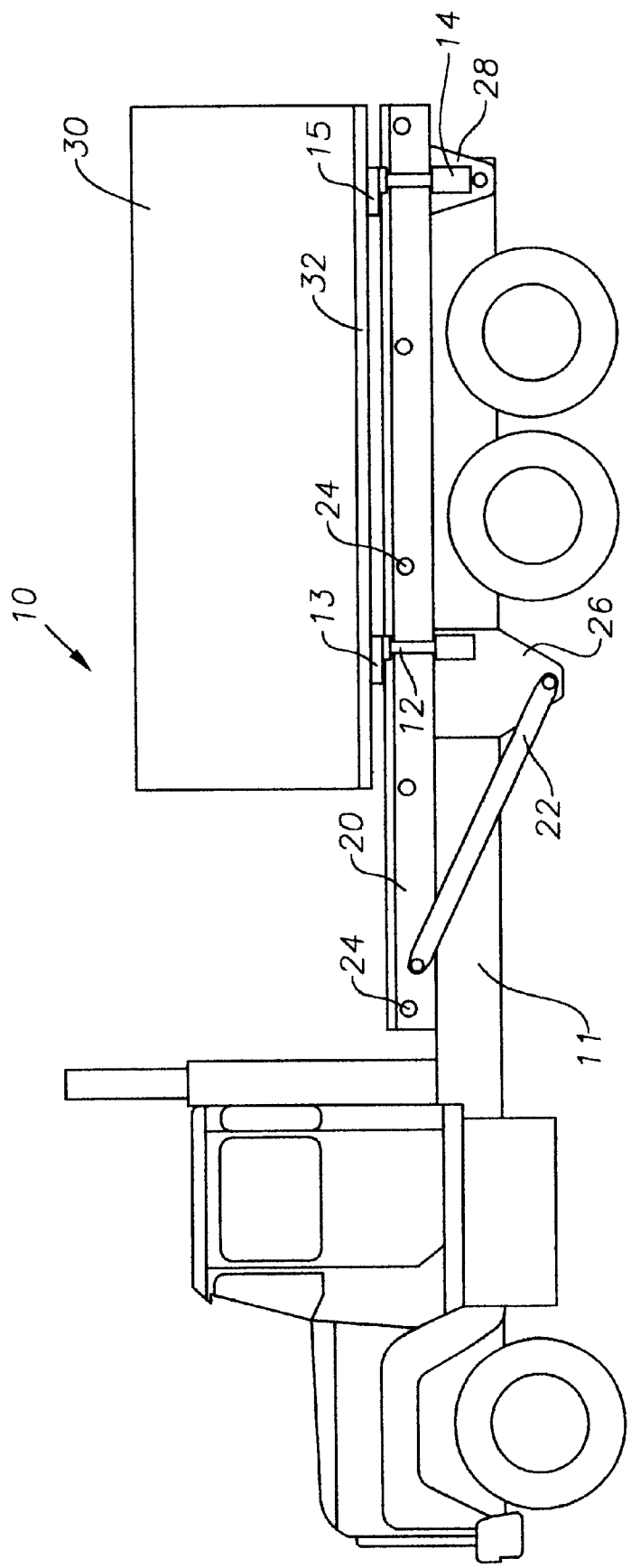
FIG. 2 is a side view of the roll-off truck with the load cells in the raised position to measure the weight of a box on the truck.

Referring to FIG. 2, the weighing of the box 30 is done when the roll-off box is in the horizontal position on the truck 10 as shown. The lifts 12 and 14 have load cells 13 and 15, respectively, on top of the lifts. When the lifts are actuated by the hydraulic system on the truck 10, each load cell is raised from a position below the rollers 24 to contact the beams 32 and raise the box 30 above the rollers 24. The lifting needs to be just sufficient to lift the box 30 off the rollers 24 which may be as little as one inch. The entire load of the box 30, either empty or filled (meaning having material in the box rather than a description of the extent of fullness), is then on the load cells 13 and 15, positioned on each side of the truck 10, as shown. The electronics of the weighing system allow the weight to be read on the recorder (not shown) in the truck cab. The recorder may print out a weight slip with such information as date, time, site and other information or simply the weight which is recorded on a recorder and manually recorded by the driver of the truck. After making the weigh recording, the lifts 12 and 14 are then actuated to lower the box 30 back on the rollers 24. This weighing procedure permits an accurate weight of the box 30 and any contents contained therein. For example, when the roll-off truck 10 arrives at a site to pick up scrap metal with an empty box 30, a weighing of the empty box 30 is carried out. The box 30 can then be partially filled with one scrap metal, such as stainless steel, and the weighing of the box and stainless steel is made, the difference in the weights resulting in an accurate weight for the stainless steel. Then a second metal can be loaded into the box with the stainless steel and a third weighing is made. This difference in weights results in an accurate weight for the second metal. All the weighings are done at the site of the pick up of metal and does not require the truck to be driven to a truck scale each time the truck and box are weighed. The advantage of the system is that an accurate weight is provided at the site of collecting the material.

Figure 3:
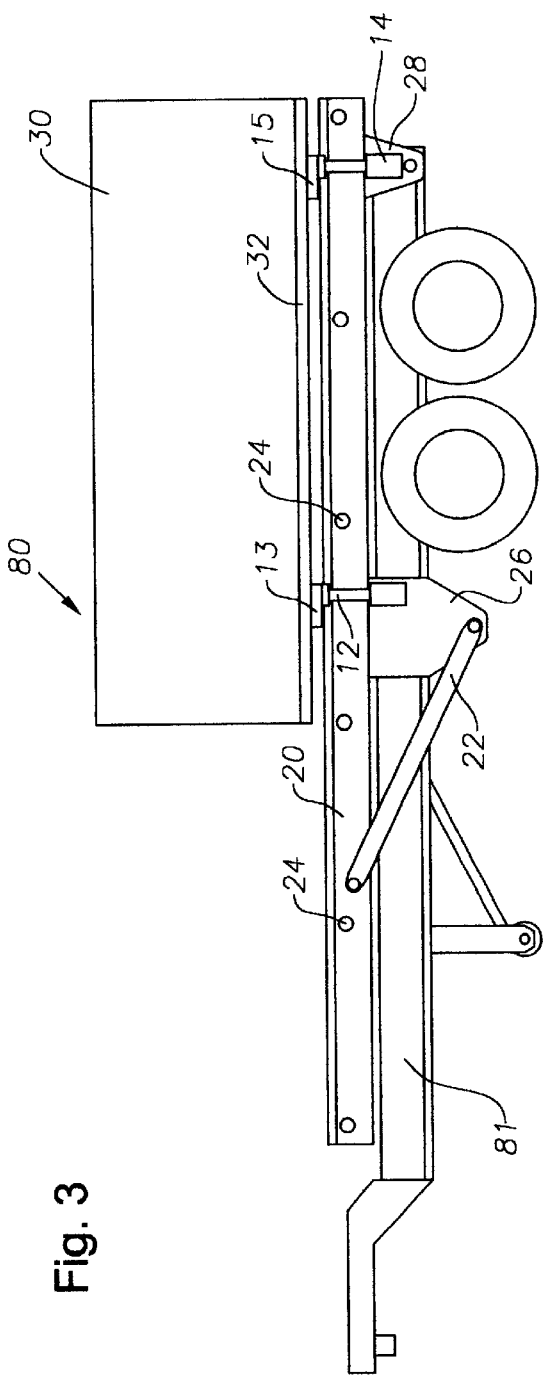
FIG. 3 is a side view of a roll-off trailer with load cells mounted to the trailer frame to provide a weighing system on the trailer.
Figure 4:
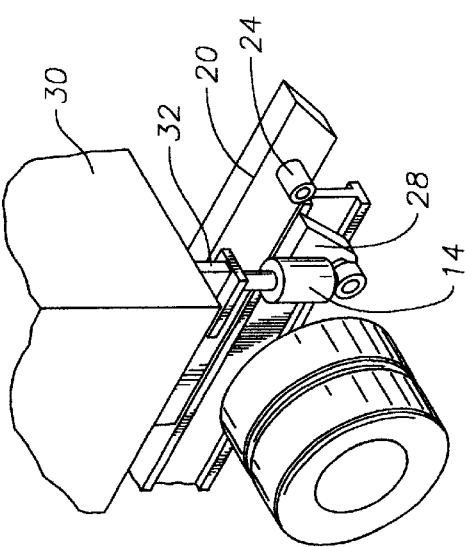
FIG. 4 is an isomeric from the rear of the truck/trailer with load cells mounted to the truck/trailer frame.

Now referring to FIG. 3, a roll-off trailer 80 is illustrated with a frame or chasis 81. The weighing system of the present invention is not changed whether the carrier and rails 20 are mounted on a truck or trailer; therefore, truck/trailer is used as a term to define the alternative structures. FIG. 4 shows that the lift 14 is secured rigidly to the frame 11 or 81 by plate 28 which is welded therto. The carrier and rails 20 are above the frame 11 or 81 and when the roll-off box 30 is in the horizontal position has the beams 32 on the bottom of the box on rollers 24. The lift or cylinder 18, having a load cell 15 on top of the cylinder rod (see FIG. 4 for structure of load cell 15), when actuated raises the load cell 15 into contact with the beam 32 of the box and raises the box 30. Four separate weights are obtained, one each from the four cells and the electronics of the weighing system may sum them into a total weight.

Figure 5:
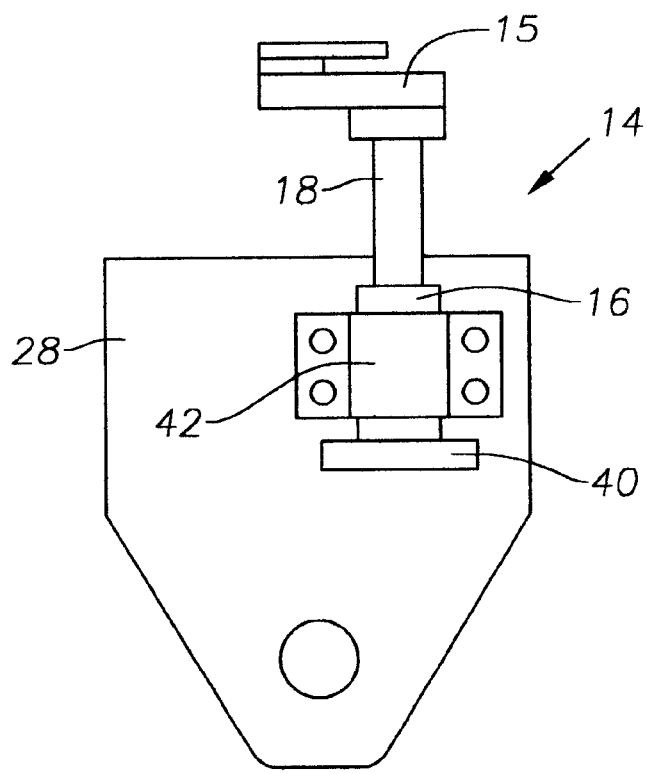
FIG. 5 is a front view of a plate on the roll-off truck/trailer with a cylinder bracketed to the plate, and the cylinder having a load cell mounted at the top of the cylinder.
Figure 6:
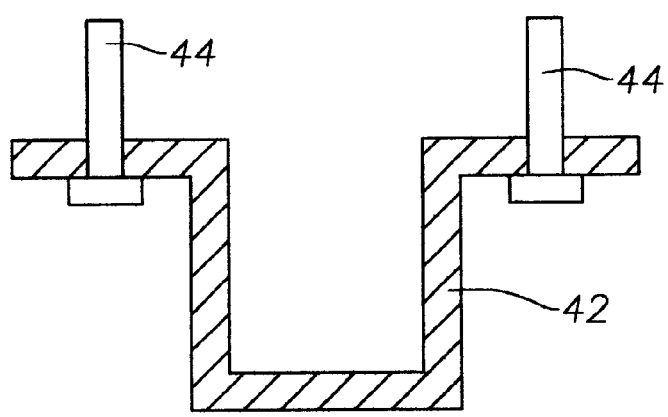
FIG. 6 is a cross-sectional view of the bracket showing the bolts which attach the bracket holding the cylinder with load cell to the plate.

A preferred lift 12 or 14 is a hydraulic cylinder 16 which is connected to the hydraulic system of the roll-off truck 10. As shown in FIG. 5, the details of lift 14 is a hydraulic cylinder 16 having a load cell 15 secured to the top of the cylinder rod 18. The cylinder 16 is shown attached to plate 28 of the roll-off truck 10. This back plate 28, when connected to the understructure of the lift, may move when the carrier and rails 20 are raised and therefore the hydraulic connections to the cylinder 16 in that instance must be movable and flexible to permit the movment of the cylinder during this raising operation. A non-movable plate 26 is shown attached to the truck closer to the front of the truck; however, a non-moveable plate may be attached to the chasis at the back of the roll-off truck 10 as well. The use of plates is not necessary and are employed because they space the lifts and load cells under the beams 32 of the box 30 or in alignment with the rollers 24. A bar or base 40 is welded to the plate 28 for supporting the cylinder 16 and providing a secure base for lifting the box 30. A bracket 42, shown in cross-section in FIG. 6, holds the cylinder 16 securely to the plate 28 using bolts 44 that pass through the plate 28 and are held with nuts (not shown) on the other side of the plate.

Figure 7:
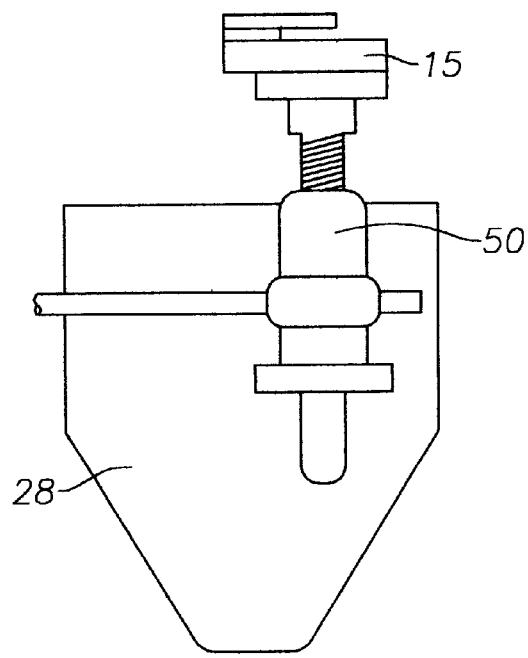
FIG. 7 is a front view of a plate on the roll-off bracketing a worm gear to the plate, and the worm gear having a load cell mounted at the top of the worm gear.
Figure 8:
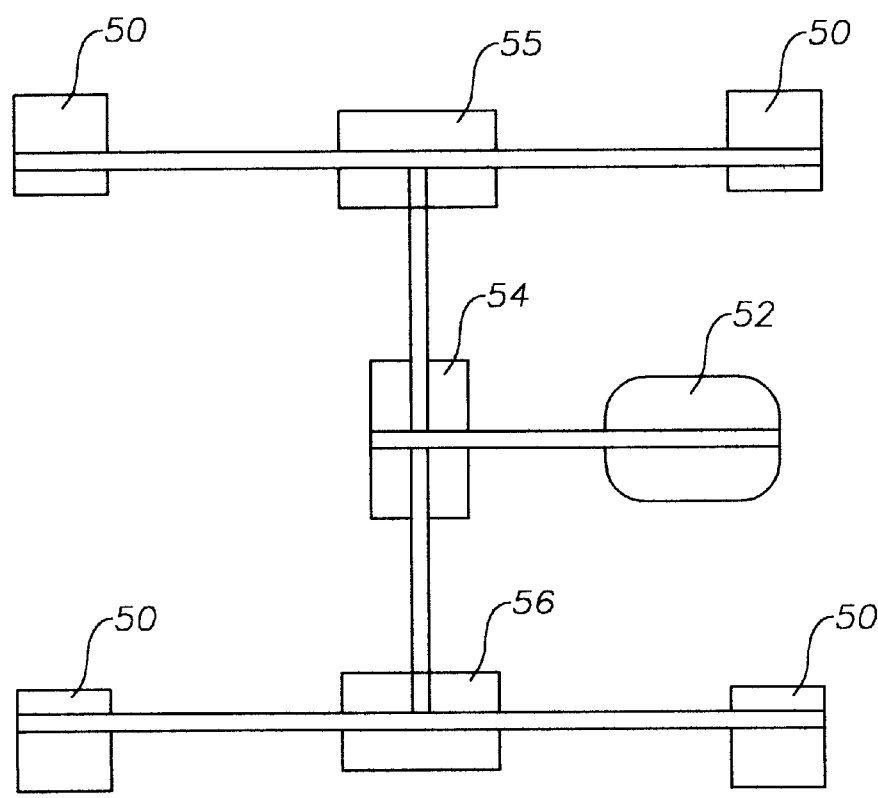
FIG. 8 is a schematic of the gearing system for actuating the worm gears.

The lifts 12 and 14 may be a worm gear 50 as shown mounted to plate 28 in FIG. 7. Attached securely to the top of worm gear 50 is a load cell 15. In the use of worm gears a hydraulic or electric motor 52, operated off power already on the truck, will provide power to the gear boxes 54, 55 and 56 which in turn power the worm gears 50 as shown schematically in FIG. 8.

The preferred load cells 13 and 15 are the load cells disclosed in detail in Ser. No. 08/492,739, filed Jun. 21, 1995, entitled "Load Cell and Weighing System", which is incorporated herein for all purposes. These load cells are able to withstand a considerable amount of rough treatment and each cell make be selected to take a load of between 5–25 tons. Accordingly, a four load cell system can measure loads of up to 20–100 tons.

Figure 9:
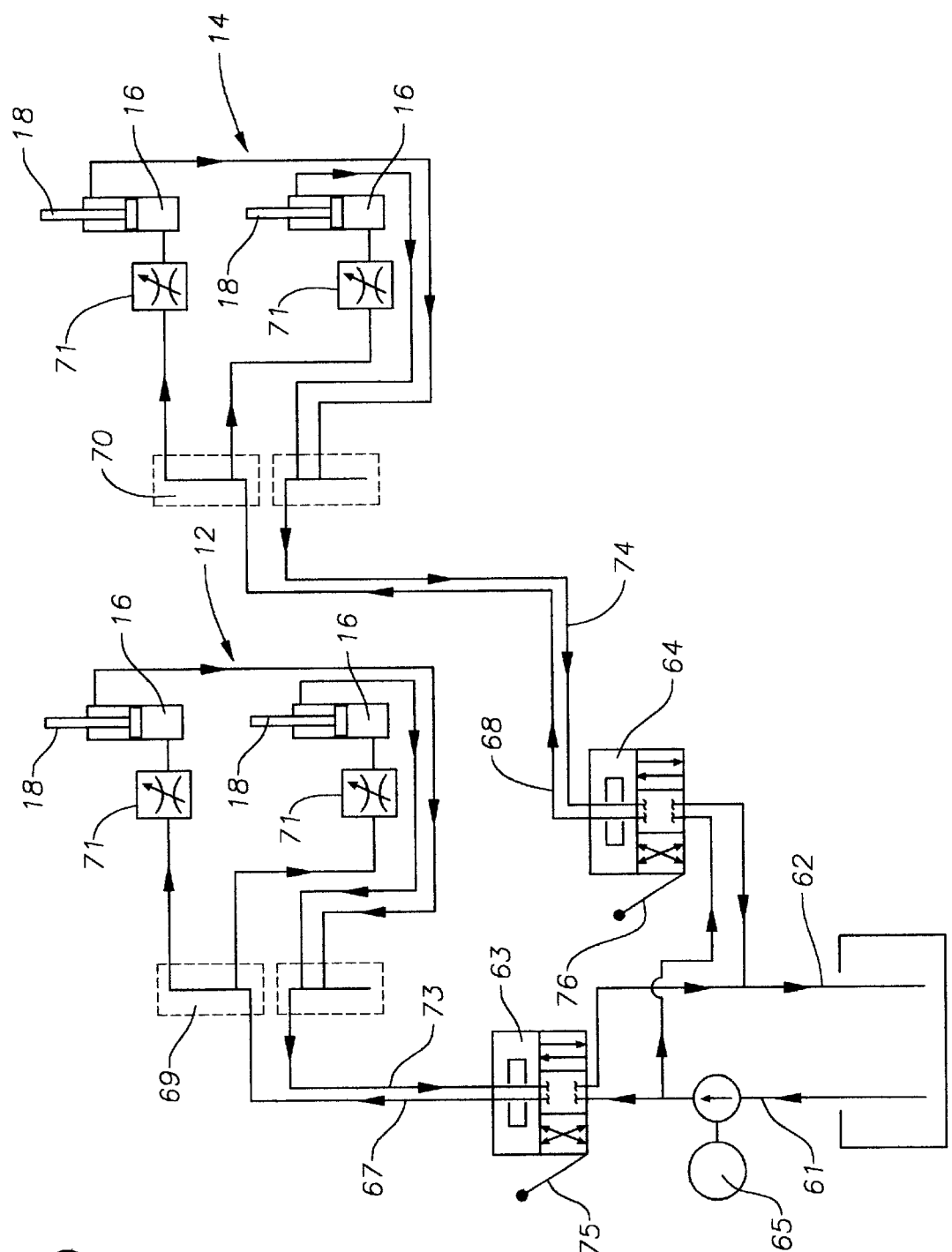
FIG. 9 is a schematic of a hydaulic system used in the present invention.

Referring now to FIG. 9, which is a schematic of the hydraulic system used on a roll-off truck 10 of the present invention especially when the front lifts 12 and back lifts 14 are cylinders 16 with rods 18. Lines 61 and 62 represent hydraulic lines or connections to the hydraulic system already on the truck 10. It is prefered that a front cylinder controller 63 control the hydraulic fluid to the lifts 12 and a back controller 64 control the hydraulic fluid to the lifts 14. An extra pump 65 may be required to assure that the pressure of the hydraulic fluid is sufficient to raise the box 30 filled to whatever extent with material. The hydraulic fluid is passed through controllers 63 and 64 and leaves by line 67 and 68 respectively. The fluid passes through manifolds 69 and 70 respectively, where the fluid is divided between the two cylinders of front lifts 12 and back lifts 14 respectively. Positioned before each cylinder 16 is a fluid controller 71 that regulates the volume and pressure in the cylinders of lifts 12 or 14 to be substantially equal and thus raised to the same level. It has been found that the prefered operation is to actuate the rear controller 64 to raise cylinder rods 18 of rear cylinders of lift 14 to start the lifting of the box 30 off the rails 20. Then acuate the front front controller 63 until the box 30 is esentially level and then raise the box to a level where an accurate weight can be obtained. As shown, hydraulic fluid is on both sides of the pistons in the cylinders 16 and the hydraulic fluid displaced in the cylinders 16 is removed by lines 73 and 74 respectively and returned to the truck hydraulic system by line 62. When the weighing has been completed the handles 75 and 76 of the controllers 63 and 64 respectively are moved to the lowering position and the hydraulic fluids in the cylinders 16 flow in the opposite direction as has been described.

Modifications of the system that are well within the skill of the art are considered part of the invention. For example a six load cell system with three load cells is possible. The lifts may include other systems than a hydraulic cylinder or worm gears. The mounting of the lifts to the truck may be more sophisticated. However the weighing system is mounted to the roll-off truck, the essential structure is to have lifts with load cells on the top of each where the box can be lifted above the rails on the load cells to weigh the box. The preferred structure as shown will align the load cells with the beams on the bottom of the box.

What is claimed:

1. A roll-off truck/trailer having a weighing system mounted on the truck/trailer for weighing a box positioned horizontally on said truck/trailer, comprising:

lifting means mounted on said truck/trailer for lifting said box, said lifting means mounted rigidly to the chasis of said truck/trailer on each side of said truck/trailer; and load cells mounted on said lifting means that contact said box.

2. A roll-off truck/trailer according to claim 1 wherein said lifting means are hydraulic cylinders.

3. A roll-off truck/trailer according to claim 1 comprising:

four lifting means mounted on said truck/trailer, two of said lifting means mounted on one side of said truck/trailer and two of said lifting means mounted on the other side of said truck/trailer.

4. A roll-off truck/trailer according to claim 3 wherein said lifting means are hydraulic cylinders.

5. A method for weighing a box on a roll-off truck/trailer having roll-off rails comprising;

positioning a box horizontally on said rails of said roll-off truck/trailer; and lifting said box with load cells mounted on top of four lifting means ridgedly mounted to the chasis of said track/trailer.

6. A method according to claim 5 wherein said lifting of said box is with at least two of said lifting means mounted on one side of said truck/trailer and at least two of said lifting means mounted on the other side of said truck/trailer 7. A method according to claim 5 wherein the load cells lift the box by contact with the beams of said box.

8. A roll-off truck/trailer having a weighing system mounted on the truck/trailer for weighing a box positioned horizontally on roll-off rails on said truck/trailer, comprising:

a plurality of lifting means mounted on said truck/trailer, at least one of said lifting means mounted on each side of said truck/trailer for lifting said box above said roll-off rails; and load cells mounted on top of said lifting means and contacting said box.

9. A roll-off truck/trailer according to claim 8 wherein said lifting means arc hydraulic cylinders.

10. A roll-off truck/trailer according to claim 8 comprising:

four lifting means mounted on said truck/trailer, two of said lifting means mounted on one side of said truck/trailer and two of said lifting means mounted on the other side of said truck/trailer.

11. A roll-off truck-trailer according to claim 4 wherein said lifting means are hydraulic cylinders.

12. A method for weighing a box on a roll-off truck/trailer having roll-off rails comprising:

positioning a box horizontally on said rails of said roll-off truck/trailer, lifting load cells mounted on top of lifting means mounted on said truck/trailer contact said box and lift said box off said roll-off rails; and weighing said box.

13. A method according to claim 12 wherein said lifting of said box is with at least two of said lifting means mounted on one side of said truck/trailer and at least two or said lifting means mounted on the other side of said truck/trailer 14. A method according to claim 12 wherein the load cells lift the box by contact with the beams of said box.

* * * * *